United States Patent
Honda

[11] Patent Number: 5,774,750
[45] Date of Patent: Jun. 30, 1998

[54] CAMERA

[75] Inventor: Tsutomu Honda, Sakai, Japan

[73] Assignee: Minolta Co., Ltd., Osaka, Japan

[21] Appl. No.: 861,025

[22] Filed: May 21, 1997

[30] Foreign Application Priority Data

May 22, 1996 [JP] Japan .................................. 8-126692

[51] Int. Cl.⁶ .............................. G03B 15/05; H04N 7/18
[52] U.S. Cl. ........................... 396/159; 396/429; 348/64; 348/371
[58] Field of Search ............................ 348/64, 370, 371; 396/159, 161, 429, 430, 374

[56] References Cited

U.S. PATENT DOCUMENTS

4,705,382  11/1987  Mukai et al. .
4,746,947   5/1988  Nakai .
4,920,371   4/1990  Kaneko .................................. 348/64 X
5,097,340   3/1992  Tanabe et al. ......................... 348/371

*Primary Examiner*—W. B. Perkey
*Attorney, Agent, or Firm*—Burns, Doane, Swecker & Mathis, LLP

[57] ABSTRACT

A camera is provided with silver halide film, a CCD for shooting, a display device, a magnetic tape and a flash device, and shooting by the silver halide film is performed while shooting by the CCD is being performed. Pictures taken by the CCD are displayed in the display device and recorded on the magnetic tape. When shooting is accompanied with a flash, exposure of the silver halide film is synchronized with a predetermined cycle of photoelectric conversion of the CCD, or the photoelectric conversion of the CCD is synchronized with the exposure of the silver halide film by varying the cycle. The picture taken by the CCD with a flash is displayed for a while just after shooting as a release-view, and can be displayed later as an after-view.

17 Claims, 9 Drawing Sheets

CAMERA

BACKGROUND OF THE INVENTION

1. Field of the Invention

The present invention relates to a camera that is capable of both shooting still pictures through exposure of silver halide film and shooting video pictures through photoelectric conversion. For example, the present invention relates to a camera in which video pictures obtained through photoelectric conversion can be used as release-views and after-views of still pictures obtained through silver halide film exposure, and in which video pictures can be recorded onto a predetermined type of recording medium.

2. Description of the Prior Art

In recent years, many cameras have been proposed that split light entering through their taking lens from an object into two light flux to direct one split light flux to silver halide film and the other to a photoelectric conversion device (CCD) so that both silver halide film shooting and video shooting can be performed. With such cameras, it is possible to perform still-picture shooting by means of the silver halide film and moving-picture shooting by means of the CCD independently or concurrently. Pictures taken through the CCD can be recorded on a recording medium for storage, or can be displayed only for viewing at the time of shooting without being recorded for storage.

In general, pictures recorded on silver halide film cannot be viewed without going through photofinishing processes such as development, and therefore it is only after a certain period of time that the photographer recognizes the condition of the pictures he has taken. Accordingly, it is not possible to set shooting conditions on the basis of already taken pictures just before trying another shot. On the other hand, since pictures taken through a CCD are recorded electronically, they can be reproduced immediately without going through processes such as development.

A camera of the type described above makes it possible to check the condition of a picture taken on the silver halide film with the help of a picture taken through the CCD. The function that allows viewing of picture at the same time as or just after it is taken is called release-view, and the function that allows reproduction of a picture for viewing sometime after it was taken is called after-view. Moreover, pictures that are viewed afterward for such purposes are themselves called a release-view and an after-view, respectively. In the following descriptions, the function that allows viewing of a picture at the same time as or just after it is taken, as well as a picture displayed for this purpose, is referred to as "release-view", and the function that allows viewing of a picture sometime after it was taken, as well as a picture displayed for this purpose, is referred to as "after-view". In addition, the function that allows confirmation of the condition of a picture just before it is taken, as well as a picture displayed for this purpose, is referred to as "preview".

When shooting takes place in dim light, the most convenient way to illuminate an object is to use flash light. For a system that performs shooting with a combination of a still camera and a video camera, Japanese Laid-open Patent Application No. H2-312365 proposes a technique of emitting a flash of light within the return trace interval of the video signal of video pictures being taken. Since no picture is recorded during the return trace interval of a video signal, this system can produce brighter still pictures without affecting the video picture.

In cameras of the type described above, in order to use a picture obtained through the CCD as a release-view or after-view of a picture recorded on the silver halide film, not only CCD shooting needs to be performed simply in parallel with silver halide film shooting, but also a shot through the CCD needs to be taken precisely at the same time as the corresponding shot on the silver halide film. In addition, the shot through the CCD should desirably have the same brightness as the corresponding shot on the silver halide film.

Furthermore, when flash light is used to illuminate an object in dim light, it is necessary to shoot correctly the object under illumination of the flash light through the CCD. For silver halide film shooting, exposure can be started at any time when the user wishes to. However, if exposure is unconditionally started in this way, with a flash of light emitted in accordance with the exposure of the silver halide film, emission of the flash may take place during the return trace interval of the video signal for CCD shooting. This prevents the CCD from recording the object under the illumination of the flash light, and thus the picture obtained through the CCD fails to serve as a release-view or after-view.

SUMMARY OF THE INVENTION

An object of the present invention is to provide a camera which is capable of both shooting through exposure of silver halide film and shooting through photoelectric conversion, which is capable of emitting a flash of light, and in which, even under flash-light illumination, a picture taken through photoelectric conversion can be used as a release-view or after-view of a picture taken through silver halide film exposure.

To achieve the above object, according to one aspect of the present invention, a camera system comprises a silver halide film shooting mechanism that controls exposure by means of a mechanical shutter; an electronic shooting mechanism that controls exposure by means of an electronic shutter; a flash device that emits flash light to an object; a controller that synchronizes starting of exposure by the silver halide film shooting mechanism, starting of exposure by the electronic shooting mechanism, and starting of flash light emission by the flash device; a flash controller that stops the flash device from emitting flash light when exposure quantity in the silver halide film shooting mechanism reaches a predetermined light amount in shooting under flash light; and an exposure controller that stops exposure by the electronic shooting mechanism when exposure quantity in the electronic shooting mechanism reaches a predetermined light amount in shooting under flash light.

According to another aspect of the present invention, a shooting apparatus includes a first shooting mechanism for performing shooting by means of silver halide film, a second shooting mechanism for performing shooting electronically, and a flash device for emitting flash light to an object, and is capable of activating the first and second shooting mechanisms simultaneously while emitting flash light. In this shooting apparatus, the first shooting mechanism is provided with a shutter mechanism, the second shooting mechanism is provided with a photoelectric conversion device, a photometry device is provided to measure exposure quantity in shooting by the first and second shooting mechanisms, a relative sensitivity in shooting by the second shooting mechanism is set higher than a relative sensitivity in shooting by the first shooting mechanism, releasing of the shutter mechanism, clearing of charge accumulated in the photoelectric conversion device, and emission of flash light are performed in synchronism, clearing of charge accumulated in the photoelectric conversion device is triggered by a signal from the photometry device indicating that exposure quantity in the second shooting mechanism has reached a predetermined light amount, and termination of flash light emission is trigger by a signal from the photometry device indicating that exposure quantity in the first shooting mechanism has reached a predetermined light amount.

According to still another aspect of the present invention, in a shooting apparatus which is capable of simultaneously performing shooting by means of a silver halide film shooting mechanism and shooting by means of an electronic shooting mechanism and which is capable of shooting under flash light, a shooting method comprises the steps of synchronizing starting of exposure in silver halide film shooting, starting of exposure in electronic shooting, and starting of flash light emission; terminating flash light emission when exposure quantity in silver halide film shooting has reached a predetermined light amount; and terminating exposure by the electronic shooting mechanism when exposure quantity in electronic shooting has reached a predetermined light amount.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
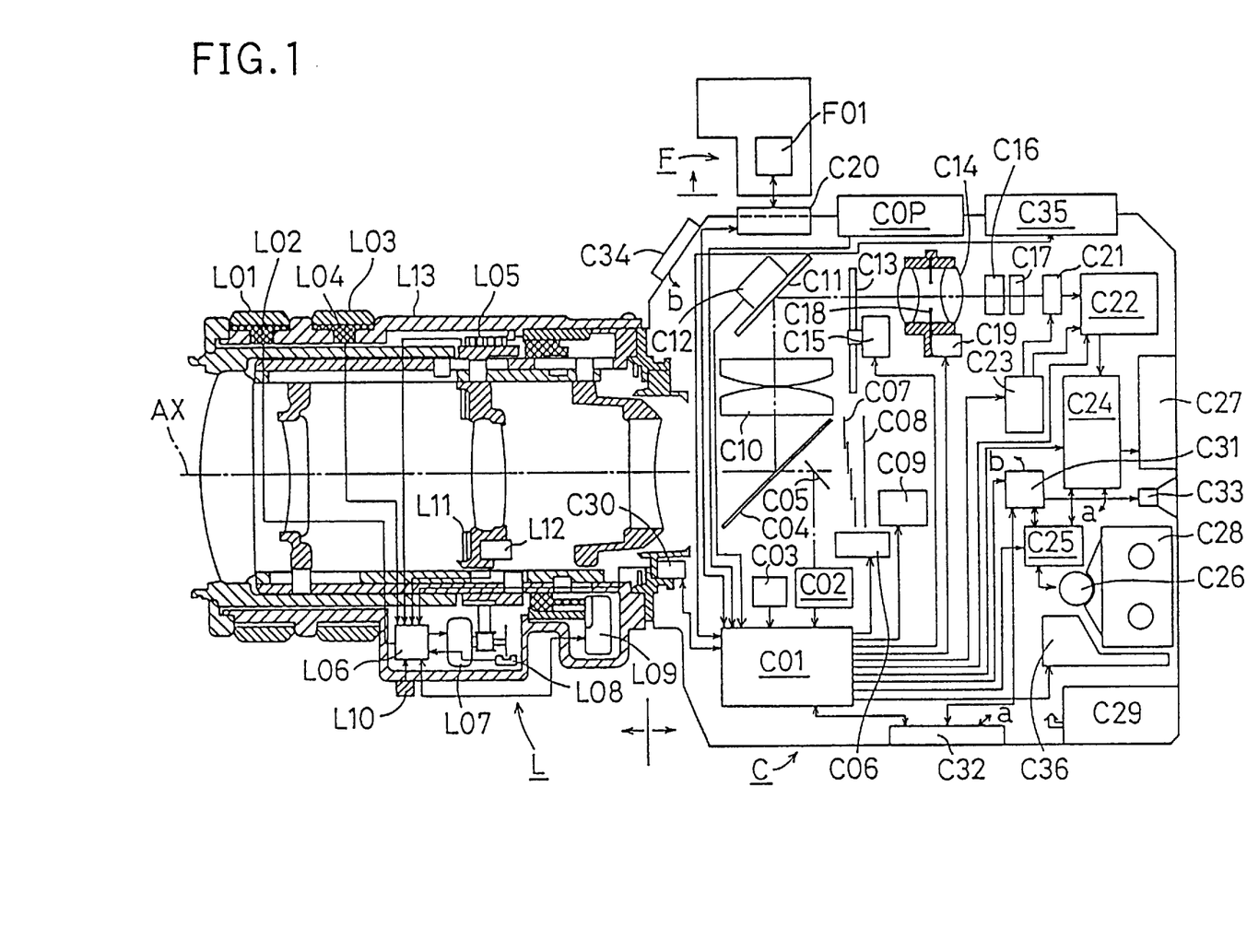
FIG. 1 is a diagram showing a first example of the construction of a camera embodying the present invention.

Hereinafter, embodiments of the present invention will be described with reference to the drawings. FIG. 1 shows a first example of the construction of a camera embodying the present invention. This camera is constructed as a focal-plane-shutter camera of a single-lens reflex type. The camera body C and the taking lens L are assembled as separate units, so that the camera body C can be used in combination with a variety of interchangeable lenses. Here, however, it is assumed that a zoom lens is mounted on the camera body C as the taking lens L, just as one example.

In this camera, light incident through the taking lens L is split into two light flux. One of the split light flux is directed to silver halide film to record a picture in the form of exposed silver halide film, whereas the other is directed to a photoelectric conversion device (CCD) to record a picture in the form of a video signal. The camera body C is provided with a display device that displays pictures reproduced from a video signal obtained from the output of the CCD, so that the CCD and the display device, in combination, serve as a viewfinder. The components constituting the camera will be explained in the following descriptions, in which components of the camera body C are identified with designations beginning with C, and components of the taking lens L are identified with designations beginning with L.

The taking lens L has, on the outer surface of its fixed lens barrel L13, operations rings L01 and L03 that can be individually rotated around the fixed lens barrel L13 by the user. Inside the operation ring L01 is provided an encoder L02 for detecting the rotation thereof, and inside the operation ring L03 is provided an encoder L04 for detecting the rotation thereof. The operation ring L01 is used to adjust the focus of the taking lens L, whereas the operation ring L03 is used to adjust the focal length of the taking lens L. In this camera, adjustment of the focus and the focal length is achieved through power focus and power zoom, respectively, each realized by the use of a motor that is driven as the operation ring L01 or L03 is manually operated by the user.

L05 represents a focal length detector for detecting the focal length of the taking lens L. L07 represents a zoom motor for adjusting the focal length of the taking lens L. L08 represents a zoom monitor for monitoring the rotation of the zoom motor L07. The zoom monitor L08 is typically realized with a photointerruptor. L09 represents a focus motor for adjusting the focus of the taking lens L. L11 represents an aperture diaphragm for restricting the amount of light admitted through the taking lens L. L12 represents an aperture diaphragm controller, which consists of a driver section including a stepping motor for opening and closing the aperture diaphragm L11, and a detector section for detecting the state of the aperture diaphragm L11. L10 represents an AF/MF selecting switch operated by the user to switch focus adjustment modes between the autofocus (AF) mode and the manual-focus (MF) mode. L06 represents a controller for controlling the focus and focal length of the taking lens L as well as the aperture diaphragm. The controller L06 is realized with a microcomputer (hereinafter also referred to as the lens microcomputer).

When the AF/MF selecting switch L10 is set for the MF mode, the lens microcomputer L06 operates as follows. As the operation ring L01 is operated for focus adjustment, its rotation is detected by the encoder L02, and is transmitted, in the form of a signal, to the lens microcomputer L06. In response, the lens microcomputer L06, after performing necessary calculations, drives the focus motor L09 to achieve focusing. As the operation ring L03 is operated for focal-length adjustment, its rotation is detected by the encoder L04, and is transmitted, in the form of a signal, to the lens microcomputer L06. In response, the lens microcomputer L06, after performing necessary calculations, drives the zoom motor L07 to achieve zooming. In addition, the lens microcomputer L06 also controls the amount of light admitted through the taking lens L by transmitting a control signal to the aperture diaphragm controller L12 and thereby instructing it to open and close the aperture diaphragm L11. Information necessary for controlling the aperture diaphragm L11 is fed from the camera body C to the lens microcomputer L06.

On the top of the camera body C, a flash and light F is mounted when necessary. The flash and light F is capable of emitting a flash of light or continuous light to illuminate an object momentarily or for certain duration, respectively. Both a flash of light and continuous light are used to illuminate an object in dim light; in general, the former is used in silver halide film shooting and the latter is used in CCD shooting. The firing of the flash and light F is controlled by a controller F01 incorporated therein. Note that, although the flash and light F and the taking lens L are assembled as a separate unit from the camera body C, it is also possible to assemble all these units as one unit.

The camera body C is provided with a controller C01 for controlling the camera body C. This controller C01 is realized with a microcomputer (hereinafter also referred to as the main microcomputer). The main microcomputer C01 not only controls the camera body C, but also communicates with the lens microcomputer L06 via communication contacts C30 and with the flash and light controller F01 via communication contacts C20 to acquire therefrom information necessary for performing shooting operations and to give them control commands.

Specifically, the main microcomputer C01 receives from the lens microcomputer L06 fixed information on the taking lens L, such as its open aperture value, longest and shortest focal lengths, as well as varying information thereon, such as the current state of the AF/MF selecting switch, and the focal length and focus as actually set at the moment; the main microcomputer C01 transmits to the lens microcomputer L06 information on the conditions to be set for a particular shooting session, such as the aperture value and focus. Moreover, the main microcomputer C01 receives from the flash and light controller F01 fixed information on the flash and light F, such as its maximum and minimum illumination angles, as well as information necessary for controlling its firing operations, such as whether it is ready for firing or not; the main microcomputer C01 transmits to the flash and light controller F01 information on the illumination angle to be set for a particular shooting session as well as signals for starting and ending firing.

The optical system provided in the camera body C is constructed as follows. C04 represents a pellicle mirror that splits light incident through the taking lens L into two light flux, one passing through the pellicle mirror and the other reflected thereby, to direct one of the split light flux to a first shooting section that uses silver halide film and the other to a second shooting section that uses a CCD. C07 represents a shutter, C06 represents a driver for driving the shutter C07, and C09 represents a film transport mechanism for transporting and rewinding silver halide film C08. These components C06, C07, C08 and C09 constitute the first shooting section.

At the back of the pellicle mirror C04 is disposed a movable total-reflection mirror (hereinafter also referred to as the submirror) for reflecting the light flux having passed through the pellicle mirror C04 downward to achieve autofocus. While shooting is being performed by the first shooting section, the submirror C05 is kept in a retracted position in which it does not intercept the light flux from the pellicle mirror C04 to the film C08.

Under the submirror C05 is disposed a focus condition detector (hereinafter also referred to as the AF module) C02. The AF module C02 is placed at a position equivalent to that of the silver halide film C08, and serves to detect the focus condition in the first shooting section by receiving the light flux reflected from the submirror C05. The AF module C02 is provided with one or more pairs of line sensors, and detects focus condition by the so-called phase-difference method, that is, in accordance with the distance between images formed on each pair of line sensors.

Above the pellicle mirror C04 are disposed a condenser lens C10 and a reflection mirror C11. The light flux reflected from the pellicle mirror C04 is condensed by the condenser lens C10, and is then directed by the mirror C11 toward the back of the camera body C. Part of the mirror Cll is made semi-transparent. Above the mirror C11 is disposed a brightness detector (hereinafter also referred to as the AE sensor) C12 realized with a photometric device. The AE sensor C12 serves to detect the brightness of an object by receiving the light flux having passed through the mirror C11.

C13 represents an ND filter, whose light transmittance can be varied in several steps including total transmission. The light transmittance of the ND filter C13 is controlled by an ND filter controller C15. C14 represents a relay optical system provided with an aperture diaphragm C18. The relay optical system C14 serves to make the shooting angle of view substantially the same between the first and second shooting sections (of which the second will be described later) having different shooting areas. C19 represents a relay optical system controller for controlling the relay optical system C14; specifically, it controls the aperture diaphragm C18 of the relay optical system C14. C16 represents an optical low-pass filter, and C17 represents an IR (infrared) cut filter.

C21 represents a CCD serving as an image sensing device. C23 represents a driver for driving the CCD in accordance with commands from the main microcomputer C01 by transmitting signals to the CCD and thereby instructing it to start and end photoelectric conversion. C22 represents an image sensing processor (hereinafter also referred to as the A/D converter) for converting the analog output of the CCD into a digital signal through sampling. C24 represents an image processor for converting the output of the A/D converter C22 into a video signal. These components C21, C22, C23 and C24 constitute the second shooting section.

Although its detailed construction is not shown in the figure, the image processor C24 consists of a signal processor for processing the signal outputted from the A/D converter C22 through gamma conversion, white-balance (WB) conversion, and other conversion to produce luminance and chrominance (Y/C) signals, that is, a video signal; a first memory for storing the video signal outputted from the signal processor; a controller for processing the video signal in accordance with commands from the main microcomputer C01; a second memory for storing the video signal outputted from the controller; and a superimposer for superimposing images.

The ND filter C13 as well as the aperture diaphragm C18 of the relay optical system C14 serves to cancel out the difference in sensitivity between the two image sensing devices, i.e. the silver halide film and the CCD, and to cancel out the increase of the light amount per unit area in the light flux directed to the second shooting section resulting from the use of the condenser lens C10 and the relay optical system C14. The amount of light directed to the second shooting section can be restricted by either of the ND filter C13 or the aperture diaphragm C18.

As a medium for recording pictures produced by the second shooting section, it is possible to use, for example, a magnetic medium such as a magnetic tape or a magnetic disk, an optical medium such as a digital video disc (DVD)

or a minidisc (MD), or a semiconductor storage medium such as a flash memory. Here, it is assumed that a magnetic tape C28 is used as the recording medium so that pictures can be readily reproduced for observation on a home-use videocassette recorder.

C26 represents a magnetic head for writing and reading data to and from the magnetic tape C28, C36 represents a driver for driving the magnetic tape C28, and C25 represents a recording/reproducing circuit for encoding and decoding a video signal. A video signal outputted from the image processor C24 is recorded through the magnetic head C26 onto the magnetic tape C28 by the recording/reproducing circuit C25, and a signal recorded on the magnetic tape C28 is read out by the magnetic head C26 and is reproduced by the recording/reproducing circuit C25. C27 represents a display (hereinafter also referred to as the EVF) for displaying pictures. The display C27 is realized with a color liquid crystal display (LCD) device. While shooting is being performed by the second shooting section, the display C27 serves as a viewfinder monitor; when a picture recorded on the magnetic tape C28 is being reproduced, the display C27 serves as a playback monitor.

C31 represents a sound processor for processing sounds collected by a microphone C34 provided in the front portion of the camera body C. An audio signal outputted from the sound processor C31 is fed to the recording/reproducing circuit C25 so that it is recorded together with a video signal outputted from the image processor C24 onto the magnetic tape C28. C33 represents a loudspeaker for reproducing sounds while a picture recorded on the magnetic tape C28 is being reproduced. C29 represents a power supply unit for supplying electrical power to the camera body C, taking lens L, and flash and light F.

C03 represents a hand-shake detector. When the hand-shake detector C03 detects a hand shake in the vertical or lateral direction of the camera, it transmits information on the handshake to the main microcomputer C01. In response, the main microcomputer C01 instructs the A/D converter C22 to shift the area in which the output of the CCD is sampled, so that the hand shake is canceled out. Thus, for an image produced by the second shooting section, a hand shake is compensated for.

COP represents an operation section, which includes buttons, levers, switches, and other members for operation. Through operation of the operation section COP, the user sets various operation modes of the camera, and enters information necessary to perform shooting. The operation section COP is also provided with a shutter-release button (not shown). The shutter-release button, when pressed halfway in (through its first stroke), outputs a signal S1ON requesting the start of automatic focus adjustment, and, when pressed fully in (through its first and second strokes), outputs a signal S2ON requesting the start of a shooting operation by the first shooting section. C35 represents an indication section for indicating information on the state of the camera, such as the modes set at the moment and the remaining power. The indication section C35 is realized with an LCD.

C32 represents a connector for connecting the camera with an external device. Through such connection, the main microcomputer C01, image processor C24, and sound processor C31 of the camera can be connected to an electronic device of any kind. For example, it is possible, via the connector C32, to input control information for the main microcomputer C01 to control the operations of the camera externally, or to output the video and audio signals of the camera to the external device. It is also possible to let the sound processor C31 record an audio signal fed from the external device onto the magnetic tape C28, instead of or in addition to the audio signal obtained internally from the microphone C34.

When, through operation of a main switch provided in the operation section COP, supply of power is started, the main microcomputer C01 transmits a control signal to the CCD driver C23 to cause the CCD to start image sensing. The signal outputted from the CCD is fed through the A/D converter C22 to the image processor C24, where the signal is converted into a video signal. The video signal outputted from the image processor C24 is fed to the display C27, where the video signal is reproduced as a color picture. Meanwhile, recording of the video signal onto the magnetic tape C28 and shooting of pictures onto the silver halide film C08 are performed independently or concurrently, in accordance with the settings made in the operation section COP.

Figure 2:
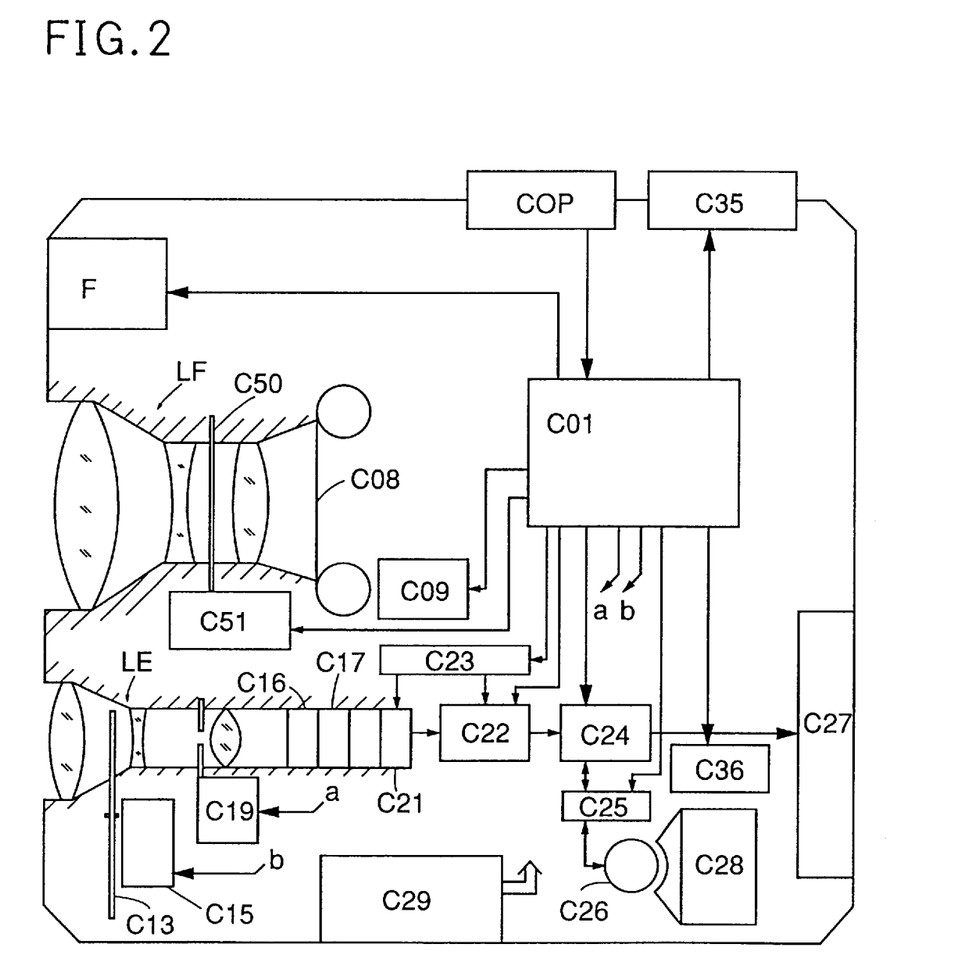
FIG. 2 is a diagram showing a second example of the construction of a camera embodying the present invention.

FIG. 2 shows a second example of the construction of a camera embodying the present invention. This camera is constructed as a lens-shutter camera of a twin-lens type. This camera is also capable of both shooting by means of silver halide film and shooting by means of a CCD, just as the camera shown in FIG. 1. For the camera shown in FIG. 2, such components as are found also in FIG. 1 are identified with the same designations, and overlapping descriptions will not be repeated. In FIG. 2, LF represents a taking lens for silver halide film shooting, C50 represents a shutter that serves also as an aperture diaphragm, C51 represents a shutter controller for controlling the releasing and closing of the shutter C50 in accordance with commands from the main microcomputer C01, and LE represents a taking lens for CCD shooting. Note also that, for simplicity's sake, such components as those belonging to the focusing mechanism, zooming mechanism, and sound processing system that are not directly relevant to the present invention are not shown in the figure.

The camera shown in FIG. 1 and the camera shown in FIG. 2 are both capable of performing CCD shooting at the same time as silver halide film shooting. Accordingly, with these cameras, it is possible to use a video picture taken by means of the CCD as a preview to confirm the condition of a picture just before it is taken on the silver halide film, or as a release-view or after-view to review a picture just after or sometime after it was taken. In particular, according to the present invention, a video picture is used as a release-view or af ter-view even in shooting under flash-light illumination.

To achieve this, an image formed on the CCD needs to be as identical as possible with the corresponding image formed on the silver halide film in the following aspects: composition, brightness, shadowiness, softness (depending on focus and depth of focus), and blurriness (resulting from the motion of an object or from a hand shake). Ideally, the two images should be identical in all of these aspects, but, in reality, it is not possible to achieve that all the time, because of various restrictions due to dif ferences between the principles on which CCD shooting and silver halide film shooting are based. Accordingly, the present invention first strives to attain in the CCD image exact reproduction of the composition and brightness of the silver halide film image, since these two, in particular the latter, are considered to be the most determinant factors for silver halide film shooting, and then seeks to achieve as exact reproduction as possible in the other aspects.

In the camera of the first construction, Equation (1) below holds with regard to the exposure of the silver halide film, and Equation (2) below holds with regard to the exposure of the CCD:

$$BV_{ag}+SV+PV=AV_{ag}+TV_{ag} \tag{1}$$

$$BV_{CCD}+SV_{CCD}+\Delta SV_{CCD}+RV+NV=AV_{CCD}+TV_{CCD} \tag{2}$$

In the camera of the second construction, Equation (3) below holds with regard to the exposure of the silver halide film, and Equation (4) below holds with regard to the exposure of the CCD:

$$BV_{ag}+SV=AV_{ag}+TV_{ag} \tag{3}$$

$$BV_{CCD}+SV_{CCD}+\Delta SV_{CCD}+NV=AV_{CCD}+TV_{CCD} \tag{4}$$

In Equations (1) to (4), $BV_{ag}$ and $BV_{CCD}$ represent the brightness of the images formed on the silver halide film and on the CCD, respectively; SV and $SV_{CCD}$ represent the sensitivity of the silver halide film and of the CCD, respectively; $\Delta SV_{CCD}$ represents the sensitivity amplification factor of the CCD; NV represents the light transmittance of the ND filter; $AV_{ag}$ represents the f-number of the aperture diaphragm of the taking lens; $TV_{ag}$ represents the shutter speed; $AV_{CCD}$ represents the f-number of the relay optical system or CCD shooting optical system; $TV_{CCD}$ represents the shutter speed of the electronic shutter; and PV and RV represent the transmittance and reflectance, respectively, of the pellicle mirror. Note that, for ease of calculation, all the values here are represented in compliance with the APEX system.

In Equations (1) to (4), the transmittance PV and reflectance RV of the pellicle mirror and the sensitivity $SV_{CCD}$ of the CCD are constants specific to a particular type of camera, and are therefore invariable. Moreover, the film sensitivity SV is a constant specific to a particular type of silver halide film, and is therefore invariable throughout a roll of film. The brightness $BV_{ag}$ of the silver halide film image depends on the f-number $AV_{ag}$ of the aperture diaphragm of the taking lens and on the shutter speed $TV_{ag}$; the brightness $BV_{CCD}$ of the CCD image depends on four variables, that is, the f-number $AV_{CCD}$ of the relay optical system or CCD shooting optical system, the shutter speed $TV_{CCD}$ of the electronic shutter, the sensitivity amplification factor $\Delta SV_{CCD}$ of the CCD, and the transmittance NV of the ND filter.

To make the brightness $BV_{CCD}$ of the CCD image equal to the brightness $BV_{ag}$ of the silver halide film image, which depends on the f-number $AV_{ag}$ of the aperture diaphragm of the taking lens and on the shutter speed $TV_{ag}$, it is necessary to adjust the four variables noted above. In the camera in FIG. 1, if the f-number $AV_{CCD}$ of the relay optical system is made equal to $AV_{ag}+\beta V$ (the f-number $AV_{ag}$ of the aperture diaphragm of the taking lens plus the reduction factor $\beta V$), and moreover the shutter speed $TV_{CCD}$ of the electronic shutter is made equal to the shutter speed $TV_{ag}$, it is possible to obtain a CCD image identical with the corresponding silver halide film image in its brightness, softness, and blurriness. In this case, either the difference in sensitivity between the silver halide film and the CCD ($SV-SV_{CCD}$), or the sum of this sensitivity difference ($SV-SV_{CCD}$) and the difference between the transmittance and reflectance (PV−RV) of the pellicle mirror is compensated for with the sensitivity amplification factor $\Delta SV_{CCD}$ of the CCD and the transmittance NV of the ND filter.

When either the value of ($SV-SV_{CCD}$) or the value of ($SV-SV_{CCD}$)+(PV−RV) noted above is too large to compensate for with the sensitivity amplification factor $\Delta SV_{CCD}$ of the CCD and the transmittance NV of the ND filter, the two images are no more identical either in softness or in blurriness, or in both. If the f-number $AV_{CCD}$ of the relay optical system is made equal to the f-number $AV_{ag}$ of the aperture diaphragm of the taking lens plus the reduction factor $\beta V$, the two images are identical in softness, but are not identical in blurriness. When the shutter speed $TV_{CCD}$ of the electronic shutter is made equal to the shutter speed $TV_{ag}$, the two images are identical in blurriness, but are not identical in softness.

In the cameras of both of the first and second constructions, the sensitivity amplification factor of the CCD is set within a range of ±3 EV, i.e. from ⅛ to 8 (times), and the transmittance of the ND filter is set within a range from −2 to 0 EV, i.e. from ¼ to 1 (time). Accordingly, compensation is possible within a range from −5 to +3 EV, and thus the brightness of the CCD image can be adjusted from one 32nd to 8 times its unadjusted brightness.

In flash shooting, flash light is emitted to brighten up an object momentarily. However, since the flash light is emitted only for very short duration, the duration of the flash light can be used in place of the shutter speed, as long as a special shooting method such as slow-synchronism flash shooting is not employed. Specifically, instead of the shutter speed $TV_{ag}$, which represents the time period for which the shutter is actually kept released, and instead of the shutter speed $TV_{CCD}$ of the electronic shutter, which represents the time period for which the CCD performs integration, the flash-light duration $TV_{fl}$ as expressed in compliance with the APEX system can be used in Equations (1) to (4). As a result, the silver halide film and CCD images are made identical in their blurriness and shades. In addition, if the previously noted compensation allows the f-number $AV_{CCD}$ of the relay optical system to be made equal to the f-number $AV_{ag}$ of the aperture diaphragm of the taking lens plus the reduction factor $\beta V$, then the two images are made identical also in their softness.

To use a video picture taken through the CCD as a release-view (after-view) of a silver halide film picture, it is essential that the video and silver halide film pictures be taken simultaneously, with the releasing and closing of the shutter and the integration by the CCD performed in synchronism. In particular, in flash shooting, a flash of light needs to be emitted at a time other than during the return trace interval of the video picture. How the exposure of the silver halide film and the integration by the CCD is synchronized in flash shooting will be described below, with reference to FIGS. 3 to 5.

Figure 3:
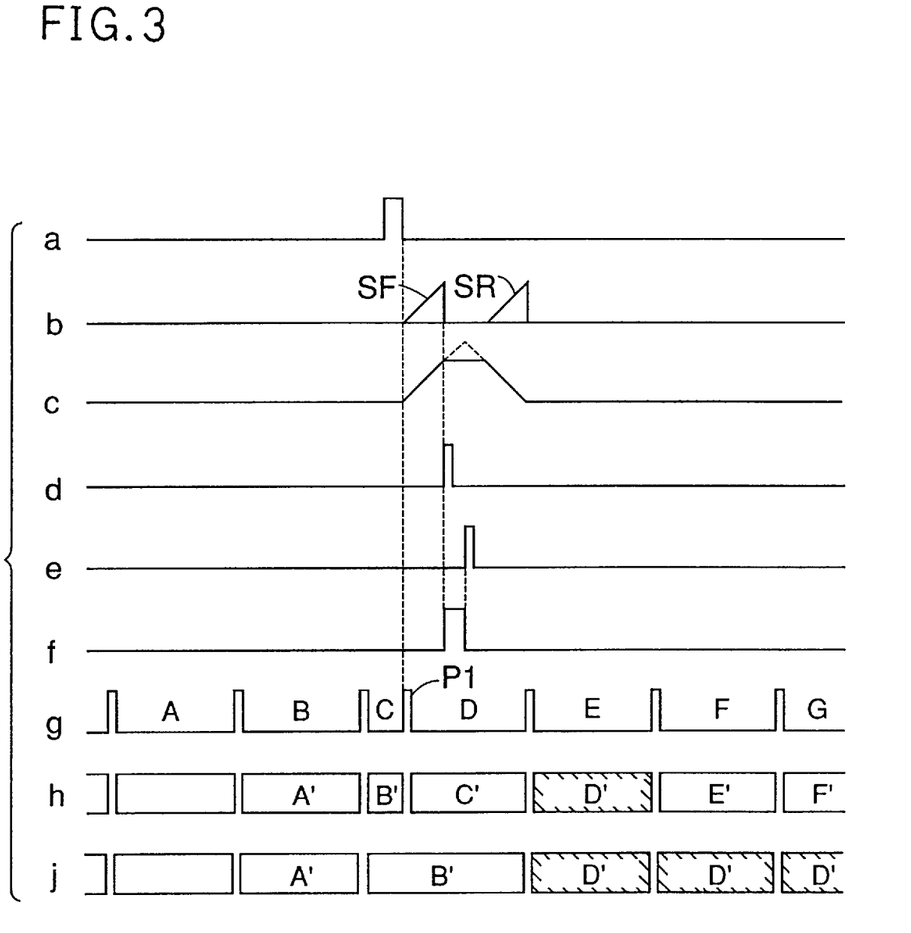
FIG. 3 is a timing chart showing a first method of synchronization in a camera embodying the present invention.

FIG. 3 is a time chart showing a first method of synchronization in a camera embodying the present invention. This method is used in a mode in which silver halide film shooting and CCD shooting are performed concurrently but in which pictures taken through the CCD are not recorded. In FIG. 3, the states of relevant signals and members in the camera are illustrated in separate graphs along a common, horizontally-taken time axis. Graph a shows a trigger signal set off by the main microcomputer when it detects the S2ON signal, which indicates that the shutter-release button is pressed fully in. Graph b shows the releasing and closing motion of the focal-plane shutter C07 of the camera of the first construction, with SF indicating the travelling motion of the front shutter and SR indicating that of the rear shutter. This shutter is released by the travelling motion of the front shutter, and, after the shutter is fully released, it is closed by the travelling motion of the rear shutter; meanwhile the silver halide film is exposed. Graph c shows the releasing and closing motion of the lens shutter C50 of the camera of the second construction. This shutter is first released to a diameter corresponding to the aperture value set at the moment, and is then closed; meanwhile, the silver halide film is exposed. In the example under discussion, the shutter is so controlled such that its releasing motion is started at the trailing edge of a trigger signal pulse.

Note that, before the trigger signal is set off, it is necessary that AF and AE operations, which are started by pressing the shutter-release button halfway in, have been completed. Specifically, through the AF operation, the AF module C02 detects the focus condition, and the focus of the taking lens L or LF is adjusted appropriately; through the AE operation, the AE. sensor C12 detects the brightness of the object, and the aperture value of the taking lens L or LF and the shutter speed are calculated and set appropriately. It is also necessary, before the trigger signal is set off, that preparations for flash-light emission, such as charging, are complete.

Graph d shows a flash trigger signal that is transmitted to the flash and light F to instruct it when to start emitting light, and graph e shows a flash extinction signal to instruct the flash and light F to stop emitting light. Graph f shows the state of light emission by the flash and light F. As shown by graph f, emission of flash light is started at the leading edge of the flash trigger signal pulse and is ended at the leading edge of the flash extinction signal pulse. In flashmatic shooting, in which a predetermined amount of light is emitted, the flash extinction signal is set off a predetermined time period after the flash trigger signal has been set off. In shooting using TTL direct light adjustment, the flash extinction signal is set off when the amount of light detected by the AE sensor C12 reaches a predetermined level after the flash trigger signal has been set off.

Graph g shows field-shift pulses that are fed from the CCD driver C23 to the CCD. In the present embodiment, one field of a video picture corresponds to $\frac{1}{60}$ seconds, and accordingly a field-shift pulse is fed to the CCD every $\frac{1}{60}$ seconds, except in flash shooting. The CCD receives the field-shift pulse during a time period corresponding to the return trace interval, and, in response, it sends out into its transmission lines the electrical charge it has accumulated until that moment through photoelectric conversion. The electrical charge is then transmitted to the A/D converter C22 in synchronism with a transferring clock. Thus, the CCD is cleared of accumulated electrical charge. The field-shift pulse is also called the charge-clearing signal. Then, the CCD starts the next cycle of photoelectric conversion a predetermined time period after the receipt of the field-shift pulse, that is, after the end of the return trace interval.

Graph h shows the state of a video signal obtained through the processing by the image processor C24 and stored therein for a time period corresponding to one field of a picture. The image processor C24 processes the digital signal outputted from the A/D converter C22 in the way as described earlier, and stores the obtained video signal for a time period corresponding to one field. The stored video signal is refreshed every time processing of a new field of the picture is finished. The image processor C24 is not only capable of such temporary storage of the video signal, but also capable of sustained storage of the video signal of a picture taken under flash-light illumination. The image processor C24 usually outputs to the display (EVF) C27 the video signal of a succession of temporarily stored pictures, but, once a picture is taken under flash-light illumination, it repeatedly outputs thereto the video signal of a picture in such sustained storage.

Graph j shows the state of the picture displayed in the EVF. The EVF displays a picture reproduced from the video signal fed thereto from the image processor C24 until a video signal of the next picture is supplied. In graphs g, h, and j, letters A, A', etc. indicate the correspondence between the pictures in the CCD, image processor, and EVF. For example, picture A' stored in the image processor is obtained by processing picture A taken through the CCD.

The trigger signal (a) is set off any time when the user operates the shutter-release button. When the trigger signal is set off, the releasing of the shutter is started (b, c), and, when the releasing of the shutter is completed, the flash trigger signal (d) is set off. In response, emission of flash light is started (f), and, when the flash extinction signal (e) is set off later at a time point determined as noted earlier, emission of the flash light is ended. Thereafter, the shutter is closed (b, c), and thus exposure of the silver halide film is achieved.

The moment the shutter starts its releasing motion, the field-shift pulse P1 is set off (g). That is, every time the trigger signal is set off, the field-shift pulse P1 is newly set off, regardless of how much time has elapsed since it was set off previously. As a result, when the trigger signal is set off, the CCD immediately outputs picture C it has been taking until that moment, and starts taking a new picture D (g). Thereafter, the field-shift pulse is set off every $\frac{1}{60}$ second, and therefore the integration time for the time period (field) in which flash light is used is $\frac{1}{60}$ second.

When the trigger signal is set off, the image processor C24 has picture B' stored therein (h), and therefore the EVF is at that moment displaying picture B' (j). When the image processor C24 receives picture C, it immediately processes that picture and stores it temporarily as picture C'. However, since the image processor C24 does not output this picture C' to the EVF at this moment, the EVF continues displaying picture B' (j). Incidentally, since photoelectric conversion of picture C is aborted in the middle of the process, this picture is dimmer than a picture produced from a complete field, and therefore picture C' is not suitable for display.

When the image processor C24 receives picture D, which was taken under flash-light illumination, it keeps that picture in sustained storage as picture D' (Jh), and outputs it to the EVF. The EVF immediately displays picture D' (j). Thereafter, the image processor C24 outputs picture D', which is kept in sustained storage, to the EVF repeatedly for a predetermined time period, for example, for several to several tens of seconds. Meanwhile, the image processor C24 receives pictures from the CCD and processes them for temporary storage (h), but does not output those pictures to the EVF. As a result, the EVF continues displaying picture D' for the predetermined time period (j). In this way, picture D, which is a picture taken on the silver halide film under flash-light illumination, can be viewed as picture D' for a while just after it has been taken, and thus picture D' serves as a release-view.

In the above described synchronization method, when a picture is taken under flash-light illumination, the integration time of the CCD, i.e. the shutter speed of the electronic shutter, is $\frac{1}{60}$ second, as in normal cases. On the other hand, when the trigger signal is set off, the field length of a picture in the image processor C24 becomes shorter, and therefore the field length is not kept even. However, since recording of a picture onto the magnetic tape C28 is not performed in this mode, such unevenness of the field length does not cause any problem. Moreover, on such an occasion, the field length of a picture displayed in the EVF becomes longer temporarily, and therefore the field length is not kept even. However, this does not cause any inconvenience to the observation of the viewfinder pictures. Furthermore, strictly speaking, the pictures displayed in the EVF are discontinuous, since one picture is skipped between pictures B' and D'. However, since the skipped picture C' has short duration that corresponds to one field at most, i.e. not more than 1/60 second, the discontinuity is not recognized as such.

Figure 4:
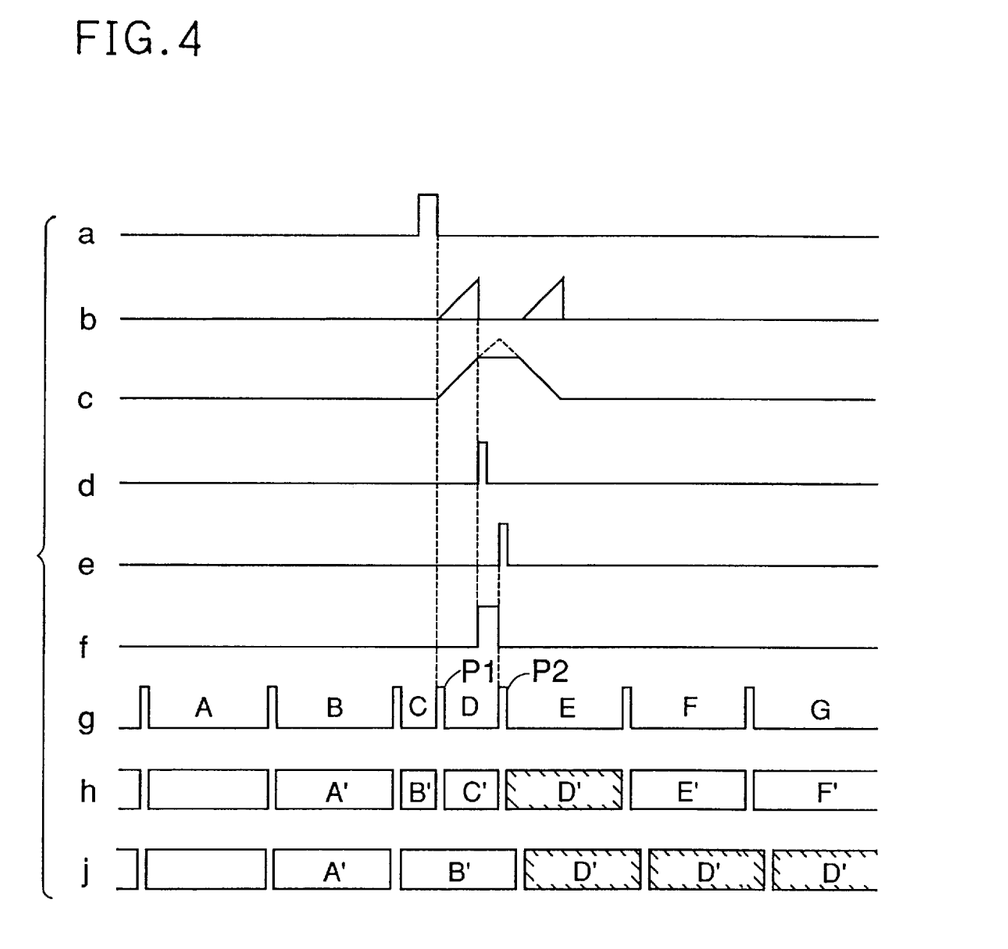
FIG. 4 is a timing chart showing a second method of synchronization in a camera embodying the present invention.

FIG. 4 is a time chart showing a second method of synchronization in a camera embodying the present invention. This method, too, is used in a mode in which silver halide film shooting and CCD shooting are performed concurrently but in which pictures taken through the CCD are not recorded. In FIG. 4, the graphs illustrating the trigger signal (a), the releasing and closing motion of the shutters (b and c), and the emission of flash light (d, e, and f) are identical to those shown in FIG. 3, and therefore overlapping descriptions will not be repeated.

In this synchronization method, the field-shift pulse P1 is set off in synchronism with the releasing motion of the shutter initiated by the trigger signal, and the next field-shift pulse P2 is set off in synchronism with the flash extinction signal (g). Thereafter, the field-shift pulse is set off every 1/60 second. When the field-shift pulse P1 is set off, the CCD outputs picture C it has been taking until that moment. The image processor processes this picture and stores it temporarily as picture C' (h), but does not output it to the EVF. The EVF continues displaying picture B' it has been displaying until that moment (j).

When the field-shift pulse P2 is set off, the CCD outputs picture D, which was taken under flash-light illumination (g), and the image processor processes this picture and keeps it in sustained storage as picture D' (h). The image processor outputs a video signal to the EVF at predetermined intervals, independently of silver halide film shooting. The image processor first outputs picture B' kept in temporary storage; then, 1/60 second thereafter, it starts outputting picture D' kept in sustained storage, and repeats outputting this picture for a predetermined time period. Meanwhile, the image processor C24 receives pictures from the CCD and processes them for temporary storage (h), but does not output those pictures to the EVF. As a result, the EVF, after displaying picture BI, displays picture D' as a release-view for the predetermined time period (j).

In this synchronization method, the shutter speed of the electronic shutter when a picture is taken under flash-light illumination is not constant, but the integration by the CCD is ended in synchronism with the end of the flash-light illumination. Note that, although picture C' is skipped and is thus never displayed, this discontinuity of the pictures displayed in the viewfinder is not recognized as such, as described previously. Moreover, although, after the field-shift pulse P2, the intervals at which the image processor stores pictures do not concur any more with the intervals at which the EVF displays pictures, this does not cause any inconvenience to the observation of the viewfinder pictures.

Figure 5:
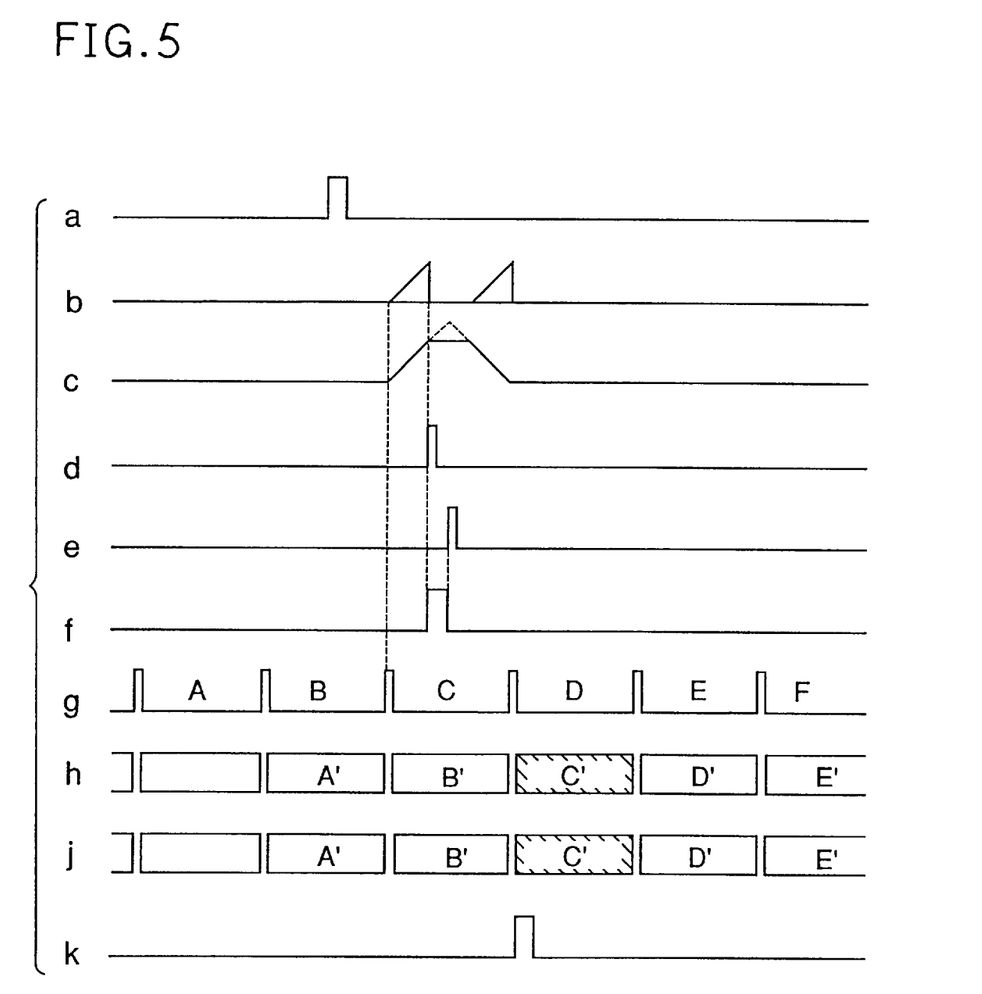
FIG. 5 is a timing chart showing a third method of synchronization in a camera embodying the present invention.

FIG. 5 is a time chart showing a third method of synchronization in a camera embodying the present invention. This method is used in a mode in which silver halide film shooting and CCD shooting are performed concurrently and in which pictures taken through the CCD are recorded. In this synchronization method, the field-shift pulse is set off at fixed intervals of 1/60 second all the time in order not to cause discontinuity in video pictures.

The trigger signal (a) is set off when, after the S2ON signal has been set off through operation of the shutter-release button by the user, preparations for flash-light emission, such as charging, are complete. The releasing of the shutter is started in synchronism with the first field-shift pulse after the trigger signal has been set off (b, c), and the flash trigger signal is set off when the releasing of the shutter is complete (d). Thereafter, the flash extinction signal is set off at a time point determined as noted earlier (e). Meanwhile, a flash light is emitted (f). Then, the shutter is closed (b, c), and thus exposure of the silver halide film is ended.

Every time the CCD receives the field-shift pulse, it outputs the picture it has been taking until that moment, and starts taking a new picture (g). Every time the image processor receives a picture from the CCD, it keeps the picture in temporary storage as well as outputs it to the EVF (h). As a result, all the pictures taken through the CCD are displayed in the EVF one after another (j). Moreover, the video signal outputted from the image processor is recorded on the magnetic tape C28. Graph k shows a flag signal, which is recorded together with the video signal on the magnetic tape C28 when picture C, which was taken under flash-light illumination, is recorded thereon as picture C'. The flag signal is used to make identification of this picture easy.

Since the picture displayed in the EVF is refreshed all the time while CCD shooting is performed, even picture C', which was taken under flash-light illumination, is displayed there only momentarily, and accordingly cannot be used as a release-view. However, since picture C' is recorded on the magnetic tape together with the flag signal, it can be readily identified. Accordingly, in this case, an after-view is realized by reproducing picture C' from the magnetic tape and displaying it in the EVF after the completion of a CCD shooting session.

It is also possible to realize an after-view by letting the image processor keep picture C', which was taken under flashlight illumination, in sustained storage while recording the signal of temporarily-stored pictures successively on the magnetic tape, and letting the image processor output picture C', which is kept in sustained storage, to the EVF repeatedly for a predetermined time period. This not only ensures correct recording of continuous pictures on the magnetic tape, but also offers a release-view. Also in this case, picture C' is recorded with the flag signal to realize an after-view.

As described earlier, the brightness $BV_{CCD}$ of the CCD image depends on four variables, that is, the f-number $AV_{CCD}$ of the relay optical system or CCD taking optical system, the shutter speed $TV_{CCD}$ of the electronic shutter, the sensitivity amplification factor $\Delta SV_{CCD}$ of the CCD, and the transmittance NV of the ND filter. When a picture taken through the CCD is used as a release-view (or after-view), it is desirable that the brightness $BV_{CCD}$ of the CCD image be adjusted, not by varying the f-number $AV_{CCD}$ of the relay optical system or the shutter speed $TV_{CCD}$ of the electronic shutter, but by varying the sensitivity amplification factor $\Delta SV_{CCD}$ of the CCD and the transmittance NV of the ND filter so that the CCD image is made identical to the corresponding silver halide film image in its softness and blurriness.

When a silver halide film picture is taken under flash-light illumination while CCD shooting is performed, the brightness of an image belonging to a field for which a flash light is used needs to be adjusted without affecting the images of the preceding and succeeding fields. To achieve this, adjustment of the brightness needs to be done very quickly, specifically within approximately 1/60 second. Since the sensitivity amplification factor of the CCD is controlled electronically, it can be adjusted quickly enough to satisfy the above requirement. On the other hand, since the transmittance of the ND filter C13 is controlled mechanically, it cannot be adjusted quickly enough to satisfy the above requirement. Sufficiently quick adjustment of the transmittance of the ND filter can be achieved only with a specialized mechanism, the use of which, however, leads to an unduly complicated camera design. Similarly, it is also difficult to adjust the aperture diaphragm of the relay optical system quickly enough to satisfy the above requirement.

Figure 6:
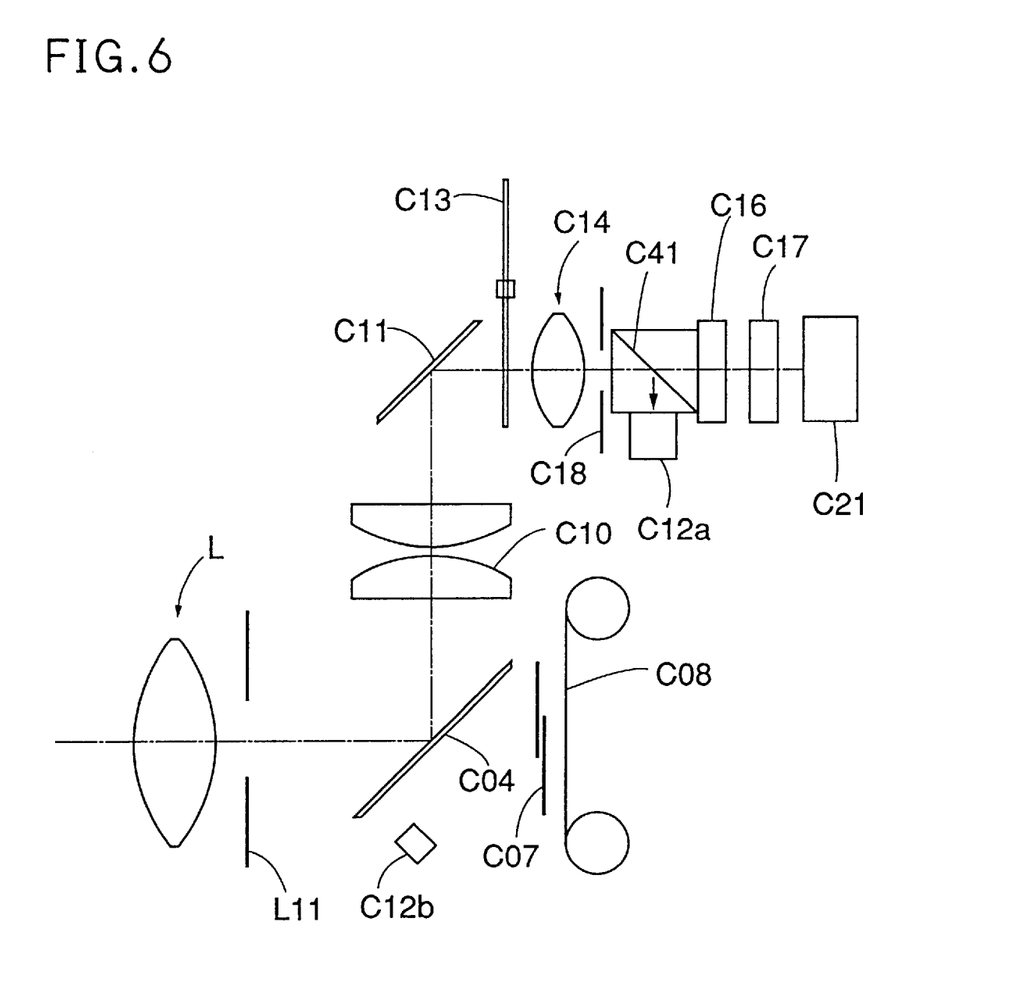
FIG. 6 is a diagram showing a third example of the construction of a camera embodying the present invention.

FIG. 6 shows a third example of the construction of a camera embodying the present invention. This construction is a variation of the first construction adapted to the above described synchronization method. In the third construction, the camera is provided with two photometry devices C12a and C12b, instead of the AE sensor C12 in FIG. 1. The first photometry device C12a measures light flux reflected from a half-mirror C41 disposed in the optical path between the relay optical system C14 and the CCD image sensor C21; the second photometry device C12b measures light flux reflected from the silver halide film C08 or the shutter C07. Except for these differences, and except that the mirror C11 here is a total-reflection mirror, the first and the third constructions are the same.

In a fourth construction (not shown), which is a variation of the second construction shown in FIG. 2, the camera is further provided with a first photometry device C12a for measuring the light flux directed to the CCD and a second photometry device C12b for measuring the light flux directed to the silver halide film. As a result, in the fourth construction, it is possible to adjust the brightness of the CCD image by varying the shutter speed of the electronic shutter. Whereas the camera of the third construction above has a focal-plane shutter, the camera of the fourth construction has a lens shutter.

Figure 7:
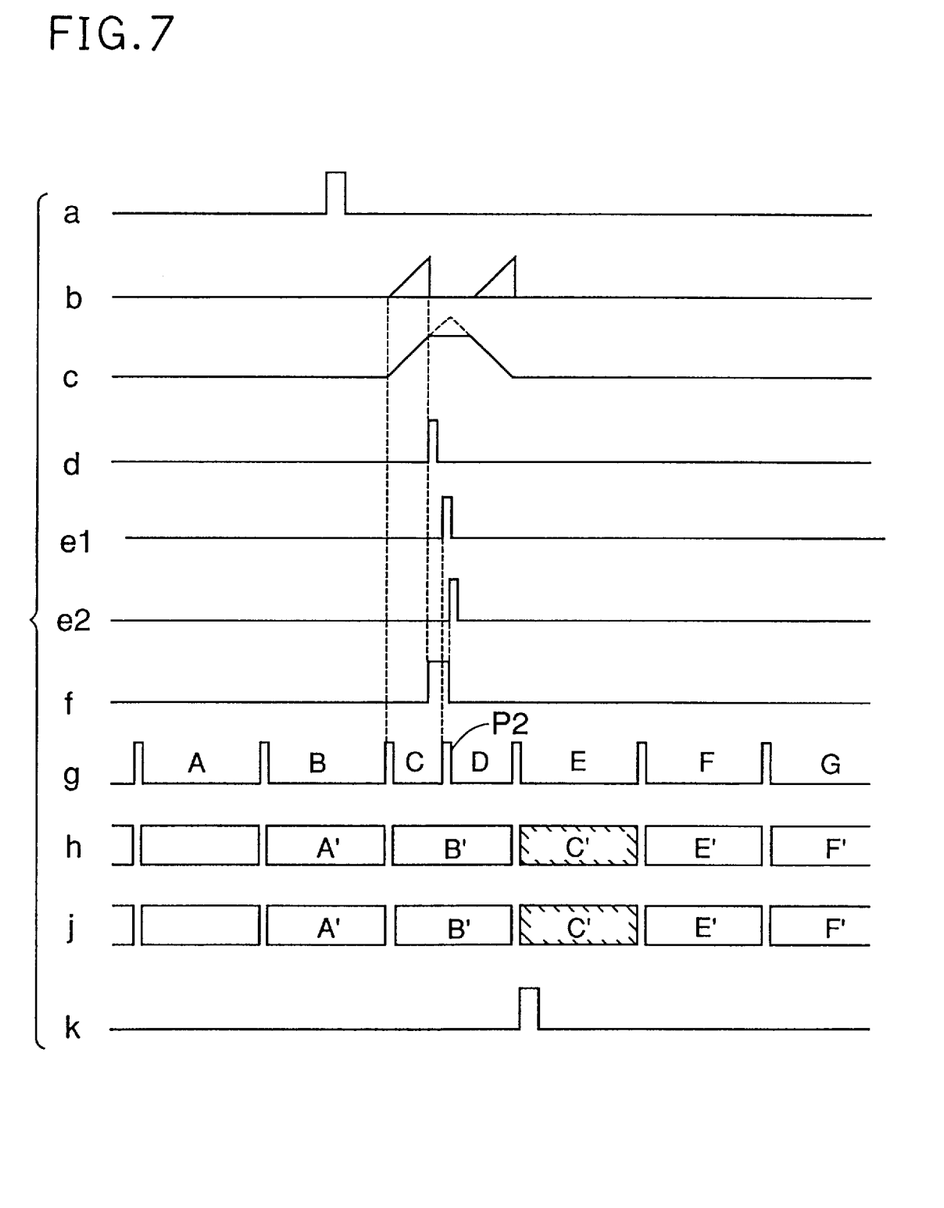
FIG. 7 is a timing chart showing a fourth method of synchronization in a camera embodying the present invention.

FIG. 7 is a time chart showing a fourth method of synchronization used in the cameras of the third and fourth construction. Just as the third method described previously, the fourth method is used in a mode in which silver halide film shooting and CCD shooting are performed concurrently and in which pictures taken through the CCD are recorded. In the fourth synchronization method, the field-shift pulse is set off at fixed intervals of 1/60 second all the time in order not to cause discontinuity in video pictures, and, in addition, an extra field-shift pulse is set off in the middle of flash emission to adjust the shutter speed of the electronic shutter.

In FIG. 7, as in FIGS. 3, to 5, graph a shows the trigger signal, graph b shows the motion of the focal-plane shutter, graph c shows the motion of the lens shutter, graph d shows the flash trigger signal, graph f shows the state of flash emission, graph g shows the field-shift pulse, graph h shows the state of the picture temporarily stored by the image processor, graph j shows the state of the image displayed in the EVF, and graph k shows the flag signal, with letters A, A', etc. indicating the correspondence between pictures.

Figure 8A:
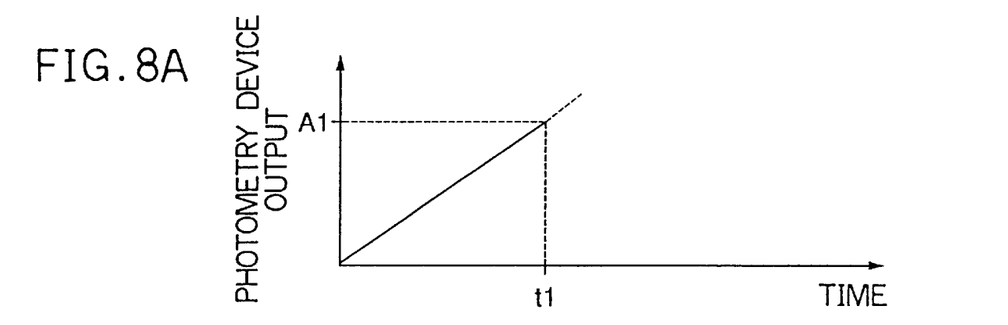
FIGS. 8A to 8C are charts showing the relationship between the amount of flash light and the first and second light-adjustment signals in the third construction example.
Figure 8B:
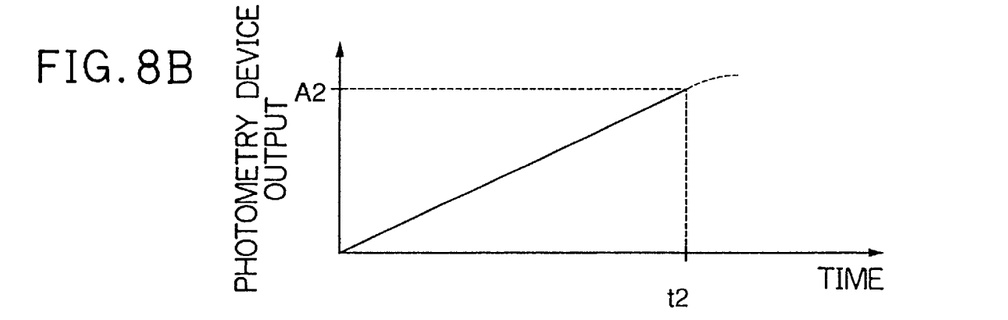
Figure 8C:
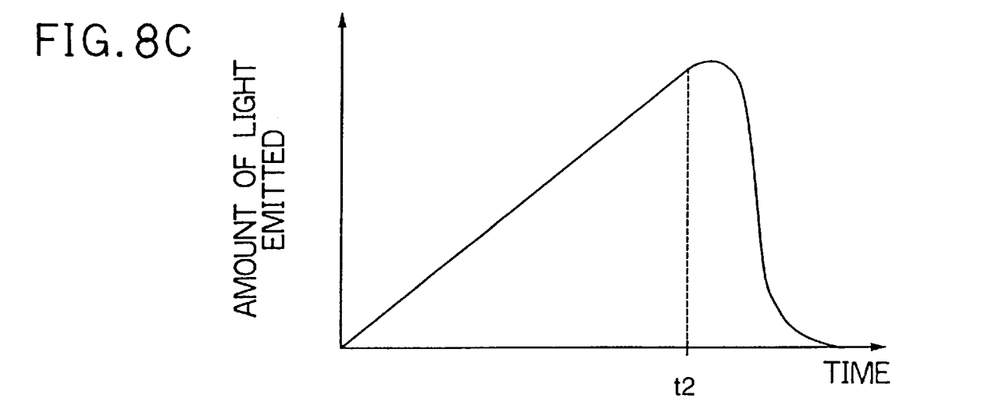

Graph e1 shows a first light-adjustment signal set off by the main microcomputer C01 when the amount of light directed to the CCD as detected by the first photometry device C12a reaches a first predetermined level; graph e2 shows a second light-adjustment signal set off by the main microcomputer C01 when the amount of light reflected from the silver halide film as detected by the second photometry device C12b reaches a second predetermined level. FIGS. 8A to 8C show the relationship between the amount of flash light and the first and second light-adjustment signals. FIG. 8A shows the signal outputted from the first photometry device C12a to indicate the amount of light it receives; FIG. 8B shows the signal outputted from the second photometry device C12b to indicate the amount of light it receives; FIG. 8C shows the amount of flash light. In all of these figures, along the horizontal axis is taken the time that has elapsed since the start of flash emission.

When, after the S2ON signal has been set off through operation of the shutter-release button, preparations for flash emission, such as charging, are complete, the main microcomputer C01 sets off the trigger signal (a). The releasing of the shutter is started in synchronism with the first filed-shift pulse after the trigger signal has been set off (b, c), and the flash trigger signal is set off when the releasing of the shutter is complete (d). When the flash trigger signal is set off, emission of a flash light is started. As a result, the first and second photometry devices C12a and C12b start receiving an increasing amount of light.

When, after the start of flash emission, the output of the first photometry device C12a reaches the first predetermined level A1 at the time point t1 (FIG. 8A), the main microcomputer C01 transmits the first light-adjustment signal to the CCD driver C23 to cause the CCD to end photoelectric conversion (e1). On receiving the first light-adjustment signal, the CCD driver C23 immediately transmits the field-shift pulse P2 to the CCD (g). On receiving the field-shift pulse P2, the CCD outputs the charge it has been accumulating until that moment to the A/D converter C22. As a result, the electronic shutter is once closed and is then released again for a new shot. Meanwhile, emission of the flash is continued, regardless of the field-shift pulse P2.

When, after the start of flash emission, the output of the second photometry device C12b reaches the second predetermined level A2 at the time point t2 (FIG. 8B), the main microcomputer C01 transmits the second light-adjustment signal, which corresponds to the flash extinction signal described earlier (e2). As a result, emission of the flash is ended (f), and then, after a time period set as the shutter speed, the shutter is closed (b, c), and thus exposure of the silver halide film is ended. Exposure of the silver halide film is controlled by TTL light adjustment.

Every time the CCD receives the field-shift pulse, it outputs the picture it has been taking until that moment, and starts taking a new picture (g). Every time the image processor C24 receives a picture from the CCD, it keeps the picture in temporary storage as well as outputs it to the EVF (h), except that it ignores and thus does not process picture D that immediately follows an extra field-shift pulse P2 inserted between regular field-shift pulses. Picture C', which is obtained by processing picture C taken under flash-light illumination, is stored for 1/60 second, as normal pictures. As a result, in the EVF, all the pictures taken through the CCD, except picture D, are displayed successively at intervals of 1/60 second (j). In addition, all the pictures except picture D are recorded on the magnetic tape C28 with fixed field lengths. For the picture C', which was taken under flash-light illumination, the flag signal is recorded together (k).

The fourth synchronization method described above aims to use a picture taken through the CCD as an after-view for a silver halide film picture taken under flash-light illumination. Also here, just as in the third method, it is possible to realize a release-view, in addition to an after-view, by letting the image processor keep picture C', which was taken under flash-light illumination, in sustained storage while recording the signal of temporarily-stored pictures successively on the magnetic tape, and letting the image processor output picture C', which is kept in sustained storage, to the EVF repeatedly for a predetermined time period.

In the fourth synchronization method described above, the brightness of the CCD image and that of the silver halide film image are measured individually, and the shutter speed of the electronic shutter and the duration of flash-light emission are respectively controlled on the basis of those measurements. To achieve this, two photometry devices C12a and C12b are provided. However, even with only one photometry device, the shutter speed of the electronic shutter and the flash-light duration can be controlled by comparing the amount of light received by that photometry device with two predetermined levels.

Figure 9A:
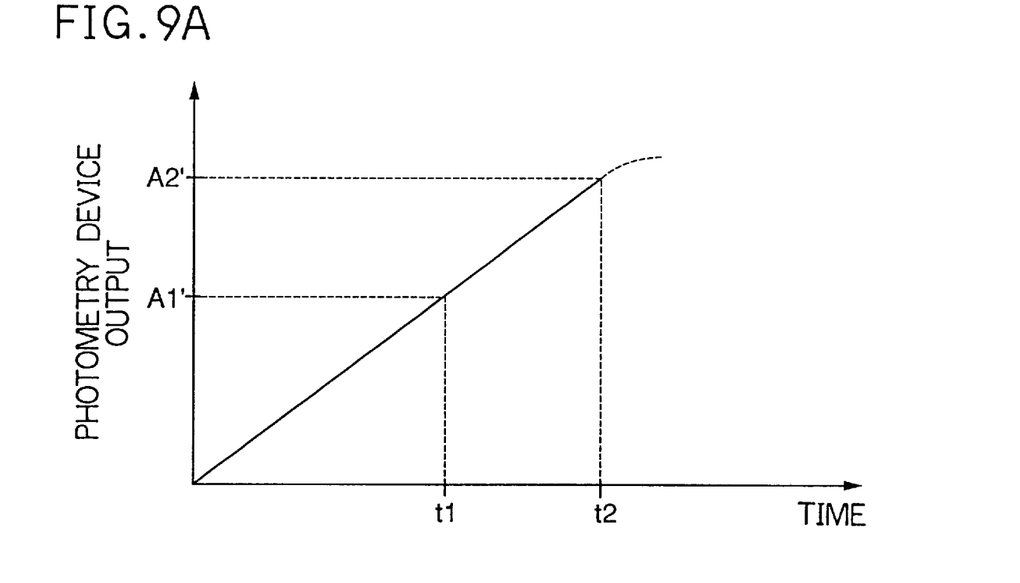
FIGS. 9A and 9B are charts showing the relationship between the flash-light amount and the first and second light-adjustment signals in other construction examples.
Figure 9B:
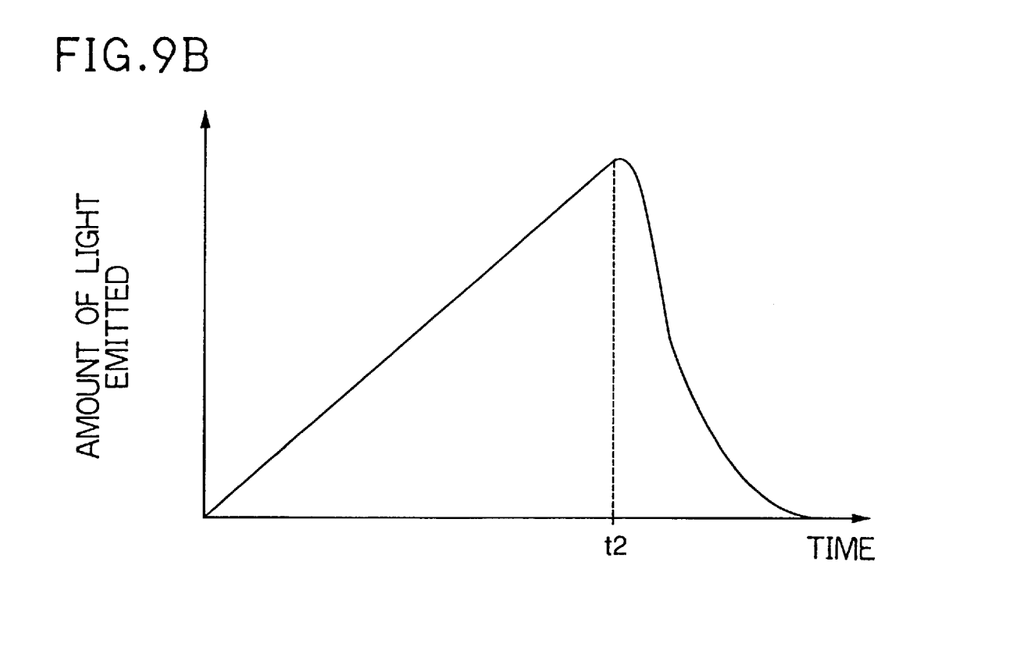

Such a synchronization method can be realized, for example, by controlling the camera of the earlier-described first construction such that its main microcomputer C01 sets off the first light-adjustment signal when the output of the AE sensor C12 reaches a first predetermined level and sets off the second light-adjustment signal when the same output reaches a second predetermined level. FIGS. 9A and 9B show the relationship between the flash-light amount and the first and second light-adjustment signals in such a synchronization method. Here, the main microcomputer C01 sets off the first light-adjustment signal at the time point ti when, after the start of flash emission, the output of the AE sensor C12 reaches a first predetermined level A1', and sets off the second light-adjustment signal at the time point t2 when the same output reaches a second predetermined level A2'. In other respects, this synchronization method is the same as the fourth method.

This synchronization method, too, allows a picture taken through the CCD to be used as a release-view or after-view of a silver halide film picture taken under flash-light illumination, even when the sensitivity of the silver halide film is lower than that of the CCD.

In a case where, in flash shooting, light adjustment is performed separately for silver halide film shooting and for electronic shooting, light adjustment for silver halide film shooting is achieved, as conventionally practiced, by ending the emission of flash light when a predetermined light-amount level is reached, whereas light adjustment for electronic shooting is achieved by the use of the electronic shutter of the CCD. In this case, it is preferable to set the sensitivity of electronic shooting higher than that of silver halide film shooting so that light adjustment for electronic shooting is completed earlier.

This control method allows light adjustment to be performed suitably for both silver halide film shooting and electronic shooting even when the relative sensitivity cannot be made equal between the two shooting methods. In particular, since this control method does not require, in electronic shooting, any additional operation of camera components, such as motion of the aperture diaphragm, to achieve light adjustment for flash shooting, it is possible to perform silver halide film shooting under flash light without causing any disturbance in electronically taken pictures.

Even if the relative sensitivity of electronic shooting cannot be set higher than that of silver halide film shooting, it is possible to make them equal by stopping down the aperture diaphragm used for silver halide film shooting, and thus it is still possible to perform silver halide film shooting under flash light without causing any disturbance in electronically taken pictures.

By way of release-views and after-views, the user can recognize the condition of silver halide film pictures without waiting for them to go through photofinishing processes. Ideally, a release-view or after-view should strictly reflect the composition, brightness, softness, and blurriness of the corresponding silver halide film picture. The present invention allows the composition and brightness of the silver halide film picture to be exactly reproduced in a release-view or after-view, without any loss in exactness even in pictures taken under flashlight illumination. Moreover, the present invention allows, in addition to exact reproduction of the composition and brightness, exact reproduction of the softness or blurriness, or both, between the two pictures. Furthermore, the present invention achieves exact reproduction of shades appearing in flash shooting.

By way of release-views, it is possible, immediately after a shot has turned out to be a failure, to retry a new shot under different shooting conditions. Thus, it is easy to obtain desired results in shooting. Moreover, in any of the synchronization method described above, CCD shooting can be performed without exposing the silver halide film, if only the releasing motion of the shutter is inhibited. Thus, these synchronization methods can be readily used to realize pre-views, if only their shutter-releasing operation is skipped.

According to the embodiment described above, a camera is capable of shooting an object under flash-light illumination concurrently both through silver halide film exposure and though photoelectric conversion, and is capable of making the two resulting pictures substantially identical with each other. As a result, in flash shooting, the condition of a picture taken through silver halide film exposure can be confirmed by the use of a picture taken through photoelectric conversion. If a picture taken through photoelectric conversion is kept displayed for an appropriate time period just after it has been taken, the picture can be used as a release-view. The two pictures resulting from the two shooting methods are identical in their composition and in the appearance of shadows due to flash light. Since emission of flash light takes place at a time other than during the return trace interval of the video signal obtained through photoelectric conversion, it does not cause failure of photoelectric conversion shooting.

Obviously, many modifications and variations of the present invention are possible in light of the above teachings. It is therefore to be understood that within the scope of the appended claims, the invention may be practiced other than as specifically described.

What is claimed is:

1. A camera system comprising:
   a silver halide film shooting mechanism that controls exposure of silver halide film by means of a mechanical shutter;
   an electronic shooting mechanism that controls exposure of a shooting device by means of an electronic shutter;
   a flash device that emits flash light to an object;
   a controller that synchronizes starting of exposure by the silver halide film shooting mechanism, starting of exposure by the electronic shooting mechanism, and starting of flash light emission by the flash device;
   a flash controller that stops the flash device from emitting flash light when exposure quantity in the silver halide film shooting mechanism reaches a predetermined light amount in shooting under flash light; and
   an exposure controller that stops exposure by the electronic shooting mechanism when exposure quantity in the electronic shooting mechanism reaches a predetermined light amount in shooting under flash light.

2. A camera system as claimed in claim 1, further comprising:
   a photometry device for measuring exposure quantity.

3. A camera system as claimed in claim 2,
   wherein two photometry devices are provided individually for silver halide film shooting and for electronic shooting.

4. A camera system as claimed in claim 2,
   wherein a single photometry device is used to measure exposure quantity, and separate threshold light-amount levels to judge exposure quantity are set individually for silver halide film shooting and for electronic shooting.

5. A camera system as claimed in claim 1, further comprising:
a display device for displaying a picture taken by the electronic shooting mechanism.

6. A camera system as claimed in claim 5, wherein a picture taken by the electronic shooting mechanism when silver halide film shooting is carried out is displayed by the display device for a predetermined time period.

7. A camera system as claimed in claim 6, wherein said picture is displayed automatically on completion of its shooting.

8. A shooting apparatus which includes a first shooting mechanism for performing shooting by means of silver halide film, a second shooting mechanism for performing shooting electronically, and a flash device for emitting flash light to an object, and which is capable of activating the first and second shooting mechanisms simultaneously while emitting flash light, wherein
the first shooting mechanism is provided with a shutter mechanism,
the second shooting mechanism is provided with a photoelectric conversion device,
a photometry device is provided to measure exposure quantity in shooting by the first and second shooting mechanisms,
a relative sensitivity in shooting by the second shooting mechanism is set higher than a relative sensitivity in shooting by the first shooting mechanism,
releasing of the shutter mechanism, clearing of charge accumulated in the photoelectric conversion device, and emission of flash light are performed in synchronism,
clearing of charge accumulated in the photoelectric conversion device is triggered by a signal from the photometry device indicating that exposure quantity in the second shooting mechanism has reached a predetermined light amount, and
termination of flash light emission is trigger by a signal from the photometry device indicating that exposure quantity in the first shooting mechanism has reached a predetermined light amount.

9. A shooting apparatus as claimed in claim 8, wherein a difference in relative sensitivity between the first and second shooting mechanisms is adjusted by varying an amplification factor of the photoelectric conversion device.

10. A shooting apparatus as claimed in claim 9, wherein said difference is adjusted further by providing a filter in a path of light flux incident on the photoelectric conversion device.

11. A shooting apparatus as claimed in claim 8, wherein a difference in relative sensitivity between the first and second shooting mechanisms is adjusted by providing a filter in a path of light flux incident on the photoelectric conversion device.

12. A shooting apparatus as claimed in claim 8, wherein a display device is provided to display a picture taken by the second shooting mechanism.

13. A shooting apparatus as claimed in claim 12, wherein a picture taken by the second shooting mechanism when shooting by the first shooting mechanism is performed is displayed by the display device for a predetermined time period.

14. A shooting apparatus as claimed in claim 13, wherein said picture is displayed automatically on completion of its shooting.

15. A shooting apparatus as claimed in claim 8, wherein a recording device is provided to record a picture taken by the second shooting mechanism onto a predetermined recording medium.

16. A shooting apparatus as claimed in claim 15, wherein a signal indicating a picture taken during silver halide film shooting is recorded onto said recording medium.

17. A shooting method in a shooting apparatus which is capable of simultaneously performing shooting by means of a silver halide film shooting mechanism and shooting by means of an electronic shooting mechanism and which is capable of shooting under flash light, comprising the steps of:
synchronizing starting of exposure in silver halide film shooting, starting of exposure in electronic shooting, and starting of flash light emission;
terminating flash light emission when exposure quantity in silver halide film shooting has reached a predetermined light amount; and
terminating exposure by the electronic shooting mechanism when exposure quantity in electronic shooting has reached a predetermined light amount.

* * * * *